July 14, 1964

C. H. TITUS 3,141,058

CERAMIC-TO-METAL SEAL FOR HIGH
VOLTAGE VACUUM DEVICE

Filed Nov. 8, 1962

INVENTOR:
CHARLES H. TITUS,
BY William Freedman
ATTORNEY.

United States Patent Office 3,141,058
Patented July 14, 1964

3,141,058
CERAMIC-TO-METAL SEAL FOR HIGH VOLTAGE
VACUUM DEVICE
Charles H. Titus, Newtown Square, Pa., assignor to
General Electric Company, a corporation of New York
Filed Nov. 8, 1962, Ser. No. 236,262
1 Claim. (Cl. 174—50.57)

This invention relates to ceramic-to-metal seals for vacuum devices that are used in high voltage electrical applications.

There is an increasing trend to use ceramic materials instead of glass for the envelopes of high voltage vacuum devices. This trend is readily understandable in view of the greater mechanical strength of ceramics as compared to glass, the ability of ceramics to withstand much higher temperatures than glass, and the generally better dielectric properties of ceramics. But despite the generally better dielectric properties of ceramics, I have found that when the envelopes are made of a ceramic material instead of glass, there is sometimes a reduction in the dielectric strength across the electrically-stressed regions within the envelope.

My studies of this matter indicate that a major factor that is responsible for this reduced dielectric strength is the construction of the seals between the ceramic envelope and the usual metallic fittings provided at the end of the envelope. The electric field gradient around the usual ceramic-to-metal seal is sometimes so high that contaminants can be liberated from the parts of the seal by the effects of the field. The introduction of such contaminants into the vacuum chamber can impair the vacuum and hence the dielectric strength across electrically stressed regions in the vacuum chamber. Even if the contaminants are condensed on the relatively cool parts of the interrupter, there may still be some impairment of the dielectric strength due to the unclean surface condition of these parts.

Accordingly, an object of my invention is to construct the ceramic-to-metal seal in such a manner that the improved dielectric properties of a ceramic material, as compared to glass, can be effectively capitalized upon when used in the envelope of a high voltage vacuum device.

Another object is to construct the ceramic-to-metal seal in such a manner that exposed portions of the seal are relieved from the high electrical field concentrations that would otherwise be present immediately adjacent these exposed parts.

In carrying out my invention in one form, I provide a tubular ceramic envelope having longitudinally opposed ends between which high voltages are established. At one of its ends, the envelope has a planar end surface extending transversely of its longitudinal axis. Adjacent this planar end surface is a metallic disk which is bonded to the ceramic envelope by means of a ceramic-to-metal seal. This seal comprises a metalizing coating between the metal disk and the planar end surface that is bonded at one side to the planar end surface and at its other side to the metallic disk. The planar end surface contains an annular groove generally surrounding the longitudinal axis of the ceramic envelope and having a depth that extends longitudinally of the ceramic envelope from the planar surface into the ceramic envelope. The surface of this groove is covered by a portion of the aforesaid metalizing coating. The groove projects from the planar surface into the ceramic material to such an extent that the region of highest electric stress adjacent the seal is located within the ceramic material.

For a better understanding of the invention, reference may be had to the following description taken in conjunction with the accompanying drawing, wherein.

Figure 1:
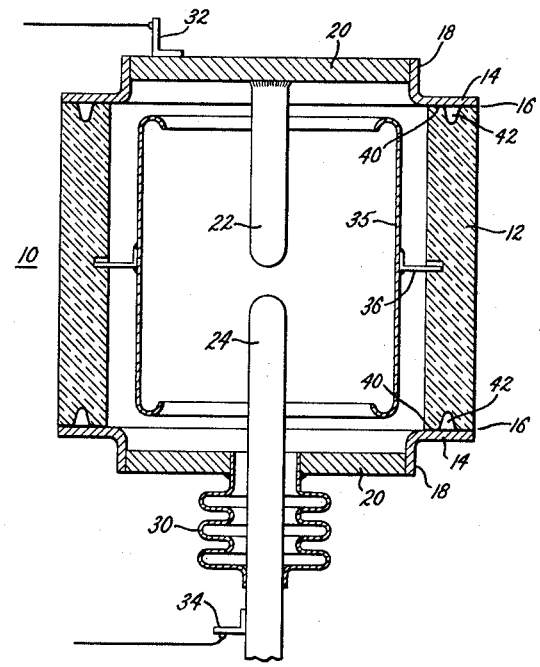
FIG. 1 is a sectional view through a vacuum type circuit interrupter embodying one form of the invention.

Referring now to FIG. 1, there is shown a vacuum-type circuit interrupter 10 comprising a tubular envelope 12 of a ceramic material, such as alumina or steatite. At opposite ends of the tubular envelope 12 are metallic end fittings 14 that are joined to the ceramic envelope 12 by ceramic-to-metal seals 16, soon to be described in greater detail. Each of these end fittings 14 has a longitudinally-extending flange 18 that surrounds an end plate 20. The end plate 20 is suitably brazed to the flange 18 about the outer periphery of the end plate to form a vacuum tight joint between these parts. The space within the envelope 12 is evacuated to a pressure of $10^{-4}$ millimeters of mercury or even lower.

Disposed within the envelope 12 is a pair of separable rod-type contacts 22 and 24. The upper contact 22 is a stationary contact that is suitably joined to the upper end cap 20, and the lower contact 24 is a movable contact that extends through an opening in the lower end plate 20. A flexible metallic bellows 30 surrounds the lower rod contact 24 and is joined in sealed relationship to the rod contact 24 and the end plate 20 at its respective opposite ends.

The contacts 22 and 24 are shown in their open position. When the movable contact 24 is driven upwardly into engagement with the stationary contact 22, the interrupter is closed, and this establishes a circuit between an upper terminal 32 and a lower terminal 34 through the contacts 22, 24. Circuit interruption is effected by driving the lower contact 24 out of engagement with the stationary contact 22 and into its open position shown. Assuming an alternating current circuit, the usual arc that is established between the contacts 22 and 24 when they are separated is prevented from restriking after the first current zero by the high dielectric strength of the vacuum inside the envelope. This vacuum also electrically isolates the contacts 22 and 24 from each other after interruption and normally prevents any electrical breakdown between these parts.

The arc that is established between the contacts during circuit interruption vaporizes some of the contact metal and forces the vapors toward the envelope 12. For protecting the envelope from these vapors, a cylindrical metallic shield 35 is provided. This metallic shield acts in a known manner to intercept the contact vapors before they can reach the envelope 12. Preferably, the shield 35 is electrically isolated from both electrodes and is supported on the envelope 12 in a centrally-disposed location by suitable support means such as 36.

It is to be understood that the various parts disposed within the vacuum have surfaces that are substantially free of oxides, sorbed gases, and other contaminants. These clean surfaces are obtained by using known high vacuum techniques and outgassing procedures, such as baking the interrupter at high temperatures while it is being evacuated.

The material customarily used for the envelope of a high voltage vacuum circuit interrupter is glass, but glass has certain limitations that can be overcome by using a ceramic material instead of glass. In this respect, ceramics are generally mechanically stronger than glass; can withstand much higher temperatures than glass, as during the above-described bakeout; and may have better dielectric properties than glass. But despite the generally better dielectric properties of ceramics, I have found that when the envelopes of vacuum interrupters are made of a ceramic material instead of glass, there is sometimes a reduction in the dielectric strength across the electrically stressed regions within the envelope. One such electrically stressed region is located between the contacts 22 and 24 in the drawing. Others are between the end of the floating shield 35 and the end fittings 14 and 20.

My studies of this matter indicate that a major contributing factor to this reduced dielectric strength is the construction of seals between the ceramic envelope and end fittings such as 14. The electric field gradient around the usual ceramic-to-metal seal is sometimes so high that contaminants can be liberated from the parts of the seal by the effects of the high field gradient. The introduction of such contaminants into the vacuum chamber can significantly impair the dielectric strength across electrically-stressed regions in the interrupter, as was pointed out hereinabove.

Figure 2:
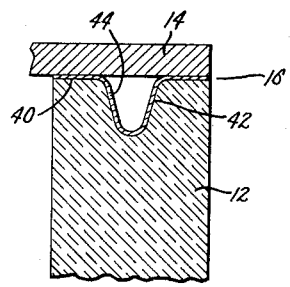
FIG. 2 is an enlarged view of a portion of FIG. 1.

This problem has been overcome in the illustrated vacuum interrupter by constructing each of the ceramic-to-metal seals 16 in such a manner that the exposed parts of the seal are relieved of the high electric field concentrations that would otherwise be present. This will appear more clearly in the following description of the seals 16, one of which is shown enlarged in FIG. 2. In each of these seals 16, the ceramic envelope 12 is provided with a planar end surface 40 that extends generally perpendicular to the longitudinal axis of the envelope. Intersecting this end surface 40 is an annular groove 42 that surrounds the longitudinal axis of the envelope and has a depth that extends longitudinally of the envelope from the planar surface 40 into the ceramic tube. The planar surface 40 and the internal surface of groove 42 are coated with a metalizing coating 44 of a conventional composition customarily used in ceramic-to-metal seals. This coating 44 is preferably applied either by spraying or brushing these surfaces with powdered metal in a suitable suspension and then firing this initial coating at a suitably high temperature to sinter it to the ceramic. Thereafter the initial coating is plated with a thin film of nickel or copper to form the final coating 44. The ceramic envelope with its end surfaces thus metalized is then joined to the end fittings 14 by conventional methods of brazing in a controlled atmosphere furnace.

The particular method used for producing the ceramic-to-metal seal is not a part of my invention and can be of any suitable conventional nature. It is important, however, that the method that is used result in a metallizing coating not only on the planar surface 40 but also on the surface of annular groove 42.

When the circuit interrupter is open, the ceramic-to-metal seals 16 are in regions of high electric stress since full line voltage exists between the opposite ends of the envelope 12 and since this voltage tends to concentrate near the ceramic-to-metal interfaces. It will be noted, however, that the region of highest electric stress is adjacent the innermost ends of the grooves 42 since in each seal this innermost end is the part that is closest to the parts at opposite voltage at the other end of the envelope. Since this region of highest electric stress is disposed in the high dielectric strength ceramic rather than in the vacuum or in the medium outside the envelope, there is much less likelihood of an electric discharge being initiated from the end fitting 14 or of corona taking place from the end fitting 14. The metallic coating 44 on the surface of groove 42, in effect, transfers the highest stress region from exposed parts of the seal to the solid ceramic insulation, thus relieving the exposed parts of the seal from these stresses and reducing the tendency of the field to liberate contaminants from these parts. This results in a vacuum device in which the dielectric strength across the stressed regions thereof is not significantly impaired by such contaminants being liberated from the seal and introduced into stressed regions.

While I have shown and described a particular embodiment of my invention, it will be obvious to those skilled in the art that various changes and modifications may be made without departing from my invention in its broader aspects, and I, therefore, intend in the appended claim to cover all such changes and modifications as fall within the true spirit and scope of my invention.

What I claim as new and desire to secure by Letters Patent of the United States is:

In a vacuum device that comprises a tubular ceramic part having longitudinally opposed ends between which high voltages are established and having a planar end surface at one of said ends extending transversely of the lnogitudinal axis of said tubular part, a vacuum-tight ceramic-to-metal joint at said one end comprising:

(a) a metallizing coating bonded at one side to said planar end surface, (b) a metallic disk having a peripheral portion adjacent the other side of said metallizing coating and bonded in vacuum-tight relationship to said metallizing coating, (c) a generally annular groove in said planar surface substantially surrounding the longitudinal axis of said ceramic part and having a depth that extends lnogitudinally of the ceramic part from said end surface into said ceramic part, (d) and a metallizing coating covering the surface of said groove and conductively connected to the metalizing coating on said end surface, (e) said groove projecting from said planar surface toward said other end of the ceramic envelope to such an extent that the region of highest electrical stress adjacent said joint is located within the ceramic material of said envelope.

References Cited in the file of this patent

UNITED STATES PATENTS

| 2,863,027 | Jennings | Dec. 2, 1958 |
| 3,090,852 | Greenwood | May 21, 1963 |

FOREIGN PATENTS

| 1,017,608 | France | Sept. 24, 1952 |
| 304,511 | Switzerland | Mar. 16, 1955 |
| 373,056 | Germany | Apr. 7, 1923 |